United States Patent [19]

Ortloff et al.

[11] 4,398,487
[45] Aug. 16, 1983

[54] FAIRING FOR ELONGATED ELEMENTS

[75] Inventors: John E. Ortloff; Matthew N. Greer; Terry N. Gardner, all of Houston, Tex.

[73] Assignee: Exxon Production Research Co., Houston, Tex.

[21] Appl. No.: 277,773

[22] Filed: Jun. 26, 1981

[51] Int. Cl.³ .................................... E21B 33/035
[52] U.S. Cl. .................................. 114/243; 166/367
[58] Field of Search ............... 175/85, 5, 7; 308/4 A, 308/126, 184 R, 203; 405/224, 216; 267/170-178; 114/243, 244, 230; 166/359, 367

[56] References Cited

U.S. PATENT DOCUMENTS

| | | | |
|---|---|---|---|
| 1,104,254 | 7/1914 | Eddelbuttel | 114/243 |
| 1,408,868 | 3/1922 | Dutcher | 114/243 |
| 1,943,827 | 1/1934 | House | 308/203 |
| 2,675,283 | 4/1954 | Thomson | 308/DIG. 7 |
| 3,020,107 | 2/1962 | Habermaas | 308/203 |
| 3,060,886 | 10/1962 | Rather et al. | 114/243 |
| 3,461,830 | 8/1969 | Pearce | 114/243 |
| 3,611,976 | 10/1971 | Hale | 114/243 |
| 3,712,261 | 1/1973 | McLelland | 114/243 |
| 3,859,949 | 1/1975 | Toussaint | 114/243 |
| 4,075,967 | 2/1978 | Silvey | 114/243 |
| 4,171,674 | 10/1979 | Hale | 114/243 |
| 4,708,605 | 3/1978 | Jones | 175/7 |

OTHER PUBLICATIONS

Grant, et al, "Riser Fairing For Reduced Drag and Vortex Supression." 9th Annual Offshore Technology Conference, OTC No. 2921, 1977.
L. M. Harris, "Deepwater Floating Drilling Operations", pp. 185-187, (1979).
Hale, "Fairing Drill Rig Riser Pipes." *Engineering Digest*, Jun. 1978.
"Rigstream," Fathom Oceanology Limited, 1976.

*Primary Examiner*—Trygve M. Blix
*Assistant Examiner*—Thomas J. Brahan
*Attorney, Agent, or Firm*—Gary D. Lawson; Richard F. Phillips

[57] ABSTRACT

A fairing for elongated elements is disclosed for reducing current-induced stresses on the elongated element. The fairing is made as a stream-lined shaped body that has a nose portion in which the elongated element is accommodated and a tail portion. The body has a bearing connected to it to provide bearing engagement with the elongated element. A biasing device interconnected with the the bearing accommodates variations in the outer surface of the elongated element to maintain the fairing's longitudinal axis substantially parallel to the longitudinal axis of the elongated element as the fairing rotates around the elongated element. The fairing is particularly adapted for mounting on a marine drilling riser having flotation modules.

3 Claims, 10 Drawing Figures

FAIRING FOR ELONGATED ELEMENTS

BACKGROUND OF THE INVENTION

This invention relates to an improved fairing for reducing current-induced stresses on a cylindrical structure due to relative movement of the structure with respect to a fluid medium in which the structure is immersed. More particularly, the fairing of the present invention is useful on a marine drilling riser to reduce current-induced stresses on the riser.

Drilling for offshore oil and gas often occurs in a marine inlet or near a river mouth in which drilling sites are characterized by strong currents. These currents may exceed 3 meters per second flowing either toward or away from the adjoining seashore, depending on whether the tide is coming in or going out. Of particular concern is the effect of the currents on a marine drilling riser. The principal purpose of the riser is to provide a fluid flow path between a drilling vessel and a well bore and to guide a drill string to the well bore. Stresses caused by high current conditions have been known to cause risers to break apart and fall to the ocean floor. Stresses on the drilling riser greatly increase as the velocity of the current increases and these stresses are magnified as the depth of water at the well location increases.

When operating in high current areas, the riser is exposed to currents which can cause at least two kinds of stresses. The first is caused by vortex-induced alternating forces that vibrate the riser in a direction perpendicular to the direction of the current. When water flows past the riser, vortices are alternately shed from each side of the riser. This produces a fluctuating force on the riser transverse to the current. If the frequency of this harmonic load is near the resonant frequency of the riser, large vibrations transverse to the current can occur. The second type of stress is caused by drag forces which push the riser in the direction of the current due to the riser's resistance to fluid flow. The drag forces are amplified by vortex induced vibrations of the riser. A riser pipe that is vibrating due to vortex shedding will disrupt the flow of water around it more than a stationary riser. This results in more energy transfer from the current to the riser, and hence more drag.

To minimize the current-induced stresses on a drilling riser, fairings have been added to the riser. Fairings generally comprise streamline shaped bodies that weathervane about the riser maintaining positions substantially aligned with the water current. It has been found that fairings can greatly reduce drag and vortex-induced forces on the riser by reducing or breaking up low pressure areas that exist down-current of the riser.

An example of a fairing proposed for drilling risers is disclosed in U.S. Pat. No. 4,171,674 which issued Oct. 23, 1979 to N. E. Hale. The fairing of this patent is made of two shell halves that are connected by a hinge along the leading edge of the fairing and by fasteners at the trailing end. The nose portion of the fairing has a longitudinal opening to accommodate the riser. The patent proposes fitting the fairing shells directly on a riser pipe if the riser is the same size as the opening in the nose portion of the fairing. Where the riser is smaller than the opening in the nose portion of the fairing or where the fairing is to be fitted to several pipes, the patent proposes attaching the fairing shells to collars that are secured to the riser. The collars accommodate the swinging motion of the fairing on the riser and provide radial and axial load bearing surfaces for the fairing.

While riser fairings proposed in the past have generally been successful in reducing the current-induced stresses on the riser, there is a need for a fairing that can be quickly and easily attached to a riser that is equipped with buoyancy modules or jackets. Buoyancy modules are used to add flotation to a drilling riser and are made to conform to the dimensions of the riser, with provisions made to clear choke and kill lines, hydraulic lines, clamps and other fixtures on the riser joints. The modules are usually 3 to 5 meters long with multiple modules attached to each riser joint. It would be difficult to fit the fairing of U.S. Pat. No. 4,171,674 directly on buoyancy modules so that the fairing will fit snugly to the modules because the surfaces of the modules are generally not perfectly round and they can vary considerably in diameter from one riser section to the next. Attaching collars to a riser having buoyancy modules and then attaching the fairings to the collars ensures a secure attachment. However, installation of collars is time consuming and can greatly increase the costs of adding fairings to a riser.

SUMMARY OF THE INVENTION

The present invention overcomes these particular prior art shortcomings by providing a fairing that may be mounted about the longitudinal axis of a substantially rigid elongated element and that will reduce current-induced forces on the elongated element. The fairing comprises a symmetrical structure having a nose portion for receiving the elongated element and a tail portion extending from the nose portion. The nose portion has an opening along its longitudinal axis to accommodate the elongated element. Bearing means supported by the structure provide bearing contact between the elongated element and the structure. Means interconnected with the bearing means accommodate variations in the outer surface of the elongated element to maintain the longitudinal axis of the fairing nose substantially parallel to the longitudinal axis of the elongated element as the fairing rotates around the elongated element. The fairing is particularly adapted for use on an elongated element having a non-uniform outer surface.

In a preferred embodiment, a plurality of fairings are rotatably mounted on marine drilling riser sections having buoyancy modules made of syntactic foam. The bearing means preferably comprise bearing pads and the means interconnected with the bearing means for accommodating variations in the outer surface of the buoyancy module preferably comprise spring assemblies that are formed integrally with the nose portion of the fairing. The spring assemblies provide the flexure needed to compensate for irregularities in the outer surface of the buoyancy module.

Retainer means are attached at the upper and lower ends of the riser sections to prevent substantial vertical movement of the fairings along the riser section. The retainer means preferably comprise retainer rings that snugly engage the upper and lower fairings on the riser section to aid in maintaining the longitudinal axes of the fairings substantially parallel to the longitudinal axis of the riser section.

In other embodiments of this invention, the bearing means comprise rollers or a combination of bearing pads and rollers. The means interconnected with the bearing means may comprise spring assemblies having helical or curved compression springs that force the bearing means against the buoyancy module. In still other embodiments, the bearing means may be attached to an elastic material, such as an elastomer or a synthetic rubber material, that permits the bearing means to move relative to the fairing structure and thereby accommodate variations in the outer surface of the buoyancy module.

Preferably, the fairings of the present invention have shoulders at the longitudinal extremities of the nose portion of the fairing to provide resistance to axial loads from adjacent fairings on the riser section.

As will be appreciated, the fairings of this invention offer significant advantages over fairings used in the prior art. The fairings can be rotatably mounted around a riser buoyancy module having a nonuniform outer surface without preattaching collars to the riser and then attaching fairings thereto. When mounted around a marine drilling riser, the longitudinal axes of the fairings will remain substantially parallel to the longitudinal axis of the riser. The fairings can therefore be mounted on top of each other arouund a marine riser having flotation modules and the fairings can rotate independently of each other.

BRIEF DESCRIPTION OF THE DRAWINGS

The construction, operation, and apparent advantages of the present invention will be better understood by referring to the drawings in which like numerals identify like parts and in which.

DESCRIPTION OF THE PREFERRED EMBODIMENTS

Figures 1, 10:
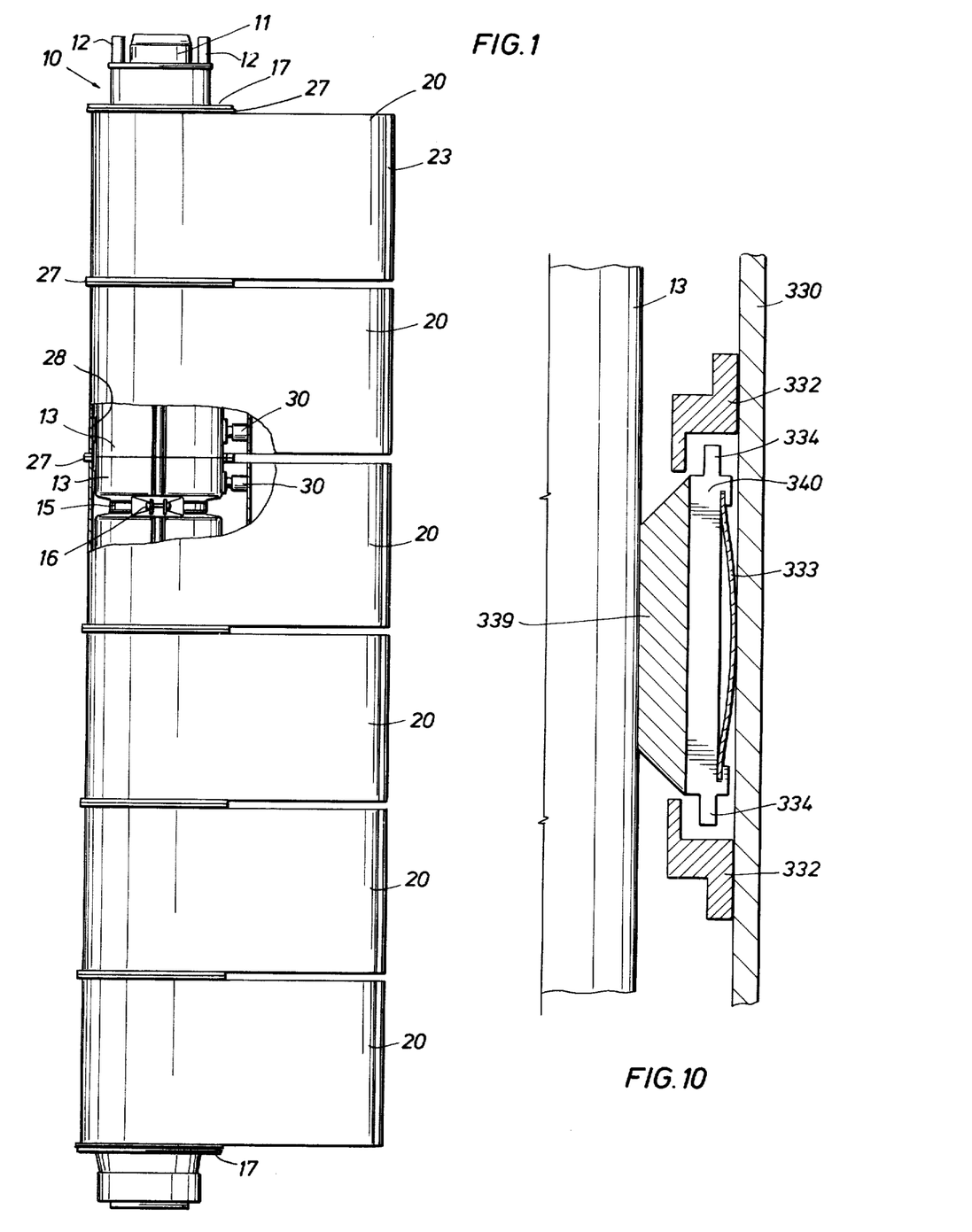
FIG. 1 is an elevation view of a section of a marine drilling riser having fairings of the present invention attached thereto with portions of two fairings broken away for purposes of clarity.
FIG. 10 is a sectional view of another embodiment of a spring system for applying spring tension on the bearing pads of fairings shown in the FIGS. 2-8.

FIG. 1 shows a section 10 of a marine drilling riser that has attached to it riser fairings 20 of the present invention. Riser section 10 is approximately 16 meters in length and is one of the many sections of a riser string (not shown) that extends between a floating drilling vessel and a subsea wellhead. The riser string itself may be several hundred meters in length. The riser section 10 comprises a center riser pipe 11, choke and kill lines 12 and other control lines (not shown). The riser pipe, choke and kill lines and other lines of the riser section 10 are encased in buoyancy modules 13 formed of semiannular sections made of syntactic foam. The syntactic foam comprises tiny glass bubbles that are held together by an epoxy of polyester resin. The surface of each module 13 is covered by a layer of fiberglass that protects the module against impact and abrasion. Stainless steel straps 15 of the type used to band heavy crates secure the modules 13 to the riser pipe 11. The straps 15 and fasteners 16 are recessed in the modules 13 to minimize undersirable hydrodynamic forces on the riser section 10 as water flows past the riser. Two retainer plates or rings 17 are bolted, clamped or otherwise secured to the riser section 10 near the upper and lower ends of the riser section 10 to prevent the fairings 20 from moving up or down on the riser section.

Although the outer surfaces of modules 13 are illustrated in the drawings as being cylindrical, the outer surfaces of modules 13 are usually not uniform. Modules 13, like most buoyancy modules when installed on a riser, have substantial irregularities on their outer surfaces. The distance between the longitudinal axis of the riser section and the outer surface of the modules may vary as much as five or more centimeters. In addition, some of the buoyancy modules 13 will probably have chipped corners and edges and other abrasions resulting from damages sustained during handling aboard the vessel or during installation of the modules onto the riser.

Several somewhat different embodiments of fairings according to this invention for mounting on the riser section 10 are shown in the drawings and described in detail hereinafter. In each embodiment, the longitudinal axes of the fairings mounted on riser section 10 remain substantially parallel to the longitudinal axis of riser section 10. The fairings 20 can therefore be mounted on top of each other about a riser section 10 as shown in FIG. 1 and the fairings will rotate independently of each other even on buoyancy modules having irregular outer surfaces. This feature of the invention is particularly important for structural survival of the fairings as the riser section 10 enters the water with fairings 20 mounted thereon. A riser section in the lower end of the moonpool in a drillship or just below the surface of the water under a semisubmersible drilling vessel is subjected to current forces from many different directions because of the interaction of waves and currents and the drilling vessel. These forces acting on the individual fairings can cause the fairings to swing or rotate violently with respect to each other, and if not properly centered on the riser, the fairings can collide and cause damage to each other or become entangled with each other.

Figure 2:
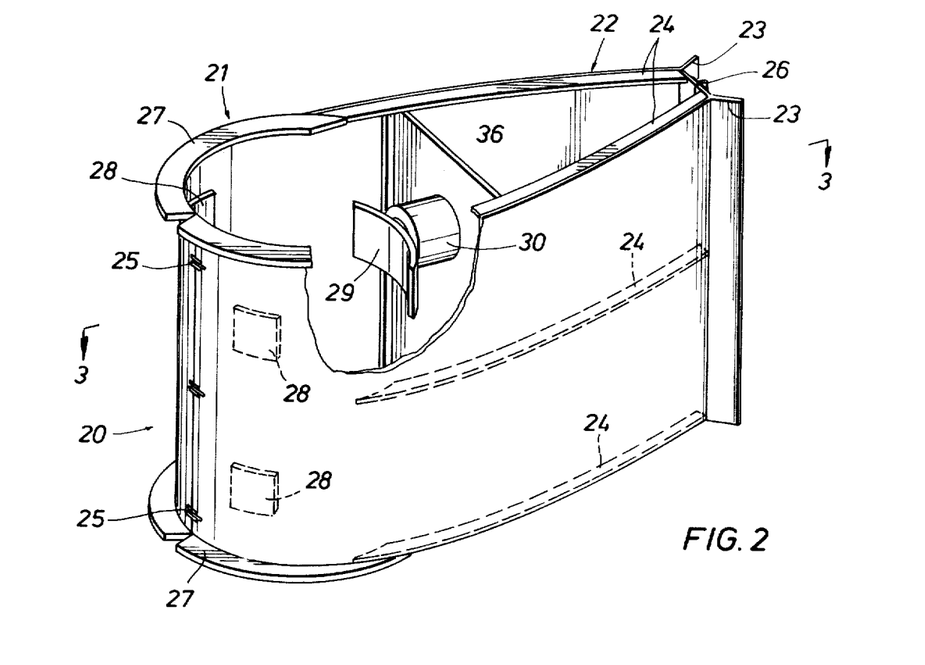
FIG. 2 is a perspective view of a fairing similar to the fairings shown in FIG. 1 with a portion of the fairing broken away for purposes of clarity.
Figure 3:
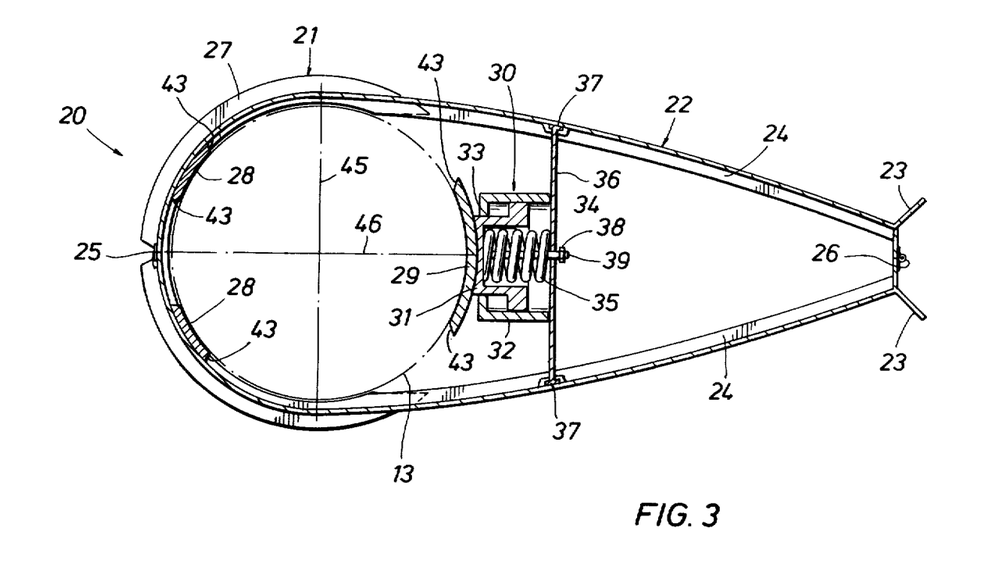
FIG. 3 is a sectional view taken along line 3—3 of FIG. 2.

Referring to FIGS. 2 and 3, fairing 20 is a substantially symmetrical structure that comprises a nose portion 21 that has a longitudinal central opening or bore to accommodate buoyancy module 13. Formed integrally with the nose portion is a tail portion 22 that has stabilizer fins 23 attached thereto at the trailing end. The fins 23 help the fairing align itself with the current flow so that the trailing end will always be on the down-current side of the riser section 10. The inner surfaces of the tail portion have reinforcing ribs 24 that extend horizontally along the length of the inner surfaces of the tail portion to add strength to the fairing shell.

Fairing 20 is formed as two shell halves that are connected together at the front end of the nose portion 21 by suitable quick release fasteners 25 and connected at the end of the tail portion by hinges 26. Examples of suitable fasteners may include over-the-center toggle action latch clamps that are commercially available. The fasteners are preferably hand operable and are corrosion resistant. The fasteners 25 are preferably located at the leading edge of the fairing to minimize water disturbance as water flows past the fairing. The hinges 26 comprise tubes that are aligned and held together by pins similar to standard door hinges.

In other embodiments of this invention, fasteners may be used at both the leading and trailing ends of the fairing or fasteners may be used at the trailing end and hinges used at the leading edge.

Fairing 20 may be assembled on the buoyancy module 13 by hingably connecting the shell halves at the trailing end and wrapping the nose portion of the fairing about the buoyancy module. The leading edges of the shells are then securely fastened by fasteners 25. Alternatively, the shell halves may be fitted together about the buoyancy module 13 and then hinge pins installed and fasteners 25 locked to secure the shells together.

The fairing 20 has shoulders 27 at the upper and lower ends of its nose portion to provide an axial load bearing surface for engagement with adjacent fairings or the retainer plate 17, depending on the fairing's location on the riser section 10. Preferably, the shoulders 27 are formed integrally with the shell portion of the fairing and are made of the same material as the fairing body.

The fairing 20 may be made of any suitable material that is strong enough to support its own weight as well as forces resulting from water currents. The fairing may be made of plastic such as a thermoplastic copolymer of acrylonitrile, butadiene and styrene known by the tradename ABS. If extra strength is needed, the plastic material may be reinforced with fiberglass. The fairing can also be made of thin metal such as aluminum or nickel alloys. The fairing is preferably made of a material that is essentially neutrally buoyant so that it does not add weight to the riser section. Also, a neutrally buoyant fairing maximizes the stability of the fairing to align itself with the currents. The fairing can be given additional buoyancy by making the ribs 24 of syntactic foam or the like. A preferred neutrally buoyant shell comprises a syntactic foam core sandwiched between fiberglass outer coverings.

The thickness of the fairing 20 measured along cross-axis 45 (see FIG. 3) is governed largely by the diameter of the buoyancy module 13. The fairing length measured along front-to-back axis 46 depends largely on design considerations. The length of the fairing is a compromise between conflicting requirements. On the one hand, clearance margins with guidelines or other obstructions, fabrication cost considerations, and a desire to minimize weight all suggest a short and stubby fairing. On the other hand, the relationship between drag and length suggests a longer fairing since it is well known that drag resistance decreases with increasing length. In most applications, it is unlikely that the length/thickness ratio will exceed 3. Practical limitations on drag, pitch stability and risk of vortex-induced vibrations suggests that the length/thickness ratio not be less than about 1.5. Preferably, the fairing length/thickness ratio ranges between about 2 and 2.5.

In selecting a particular structural design for fairing 20, the hydrodynamic center of the fairing should be down-current of the center of rotation (or pivot point) of the fairing. The location of the hydrodynamic center is important because it determines whether or not the fairing will weathervane into the current. If the hydrodynamic center is down-current of the center of rotation, the fairing will act like a stable weathervane and point in the current direction with minimum drag. If the hydrodynamic center is up-current of the center of rotation, the fairing will seek some other direction and the resulting disorientation can cause high drag forces.

Referring again to FIGS. 2 and 3, fairing 20 rotatably engages module 13 on bearing pads 28 and 29. The bearing surfaces of the pads 28 and 29 are preferably concave to accommodate the convex surface of the buoyancy module 13. The edges 43 of the pads are preferably outwardly sloped to facilitate movement of the pads over the module's outer surface. The pads may be any suitable thickness to allow the fairing to rotate on the buoyancy module 13 for a desired period of time without wearing away to the point of permitting the fairing shells to contact the buoyancy module. FIGS. 2 and 3 show four pads 28, two located near the top of the fairing and each located an equal distance from the leading edge of the fairing and the other two pads similarily positioned near the bottom of the fairing. However, as will be discussed in more detail below, the pads 28 may be arranged in other patterns that permit the fairing to rotate about the buoyancy module and prevent the fairing body from contacting the module.

Two bearing pads 29 (only one pad 29 is shown in the drawings) are pressed against the down-current side of buoyancy module 13 by spring assemblies 30. One spring assembly is near the top of fairing 20 and the second spring assembly (not shown) is near the bottom of the fairing. Pads are preferably the same distance from the longitudinal ends of the fairing as pads 28 for optimum stability. Each pad 29 is attached by rivets, bolts, glue, cement or other suitable means to the end of a piston 31 that is adapted to telescope in and out of housing 32 with respect to the module 13. The piston is secured within the housing 32 by end cap 33 and flange 34. The piston 31 is urged towards the limits of its extension by means of a helical compression spring 35 having one end bearing against the piston head and the other end bearing against frame structure 36. The spring 35 allows the pads to accommodate variations in the outer diameter of the buoyancy module while ensuring a snug fit of the fairing about the module.

Frame structure 36 extends between the shell halves of the tail portion of the fairing. Ends 37 of the frame structure are T-shaped for engaging complementary T-shaped grooves formed on the inner surface of the tail portion of the shells. The frame structure 36, with spring assembly 30 attached thereto, may be installed in the fairing after the shell halves have been placed about the buoyancy module 13 and fastened together. Once the fairing shells are in place, the frame structure 36 is slid into place from the top of the fairing. To facilitate insertion of the frame structure into the fairing shells and to avoid damaging the bearings 29 during installation, the piston 31 may be withdrawn into housing 32 and retained therein by tightening of nut 38 on threaded rod 39 which is attached to the piston and extends through the spring 35 and frame structure 36. Once the frame structure 36 with spring assembly 30 is in place, the nut 38 is loosened and backed off to the end of the rod 39, thereby permitting the spring assembly 30 to force bearing pad 29 against the module 13. Nut 38 is preferably self-locking to prevent loss during service.

The bearing pads 28 and 29 may be made of any suitable materials that will provide an effective bearing surface between the pads and the buoyancy module 13 and that will permit the fairing to rotate with changes in current direction. The composition of the bearing pads will depend largely on the composition of the buoyancy module surface, the spring tension between the pads and buoyancy module and the desired life expectancy of the pads. Suitable materials for use on syntactic foam buoyancy modules may include polyurethane, Teflon (trademark) and nylon, with nylon being preferred.

Pads 29 should be pressed against the buoyancy module with enough force to maintain the longitudinal axis of the nose portion of the fairing substantially parallel to the longitudinal axis of the riser. The bearing pads should not be biased against the module with such force that the frictional forces between the pads and the module 13 will prevent the fairing from weathervaning about the module as the direction of the ocean currents changes. To effectively reduced currect-induced stresses on the riser, the fairing should be headed in a direction that is within 5 degrees, and preferable within 2 degrees, of the current direction. The force exerted on pad 29 can be adjusted by regulating the size of the helical spring 35. An effective spring tension can be determined by those skilled in the art, taking into account the weight of the fairing, the expected coefficient of friction between the pads 29 and the module 13, and the hydrodynamic forces that are expected to act on the fairing 20.

In accordance with this invention, the bearing pads 28 and 29 can be of any size and have dimensions that permit the fairing to freely rotate about the buoyancy module with changes in current direction. Preferably the width of the pad's bearing surface is wider than any gap on the outer surface of the buoyancy module 13. It is not necessary that the bearing pads have the same size. Pads 28 and 29 shown in FIGS. 2 and 3 illustrate just one example of many different bearing pad arrangements and sizes that may be used in this invention.

It is also not necessary in this invention to have two bearing pads 29 on the down-current side of the buoyancy module 13. Only one pad 29 pressed against module 13 is needed to practice this embodiment of this invention. However, two or more pads 29 pressed against the module 13 are preferred to give the fairing optimum pitch stability.

Pads 29 need not be on the same vertical plane as that shown in FIGS. 2 and 3. A fairing three pads pressed against module 13 on the down-current side of the fairing may, for example, be arranged so that two pads are located ner the bottom of the fairing on the same horizontal plane with each pad located an equal distance from a vertical plane passing through front-to-back axis 46 (see FIG. 3) and the third pad may be located near the top of the fairing on a vertical plane passing through axis 46.

The fairings 20 may be attached to riser section 10 on the drilling vessel as the riser is being run. The fairings are preferably attached to the riser so that the bearing pads engage surfaces of the buoyancy modules that are substantially free of gaps or obstructions. For example, the buoyancy modules are preferably positioned so that the pads 28 and 29 will not ride on recesses in which the straps 15 are located and will not ride on gaps between adjoining buoyancy modules. To ensure that the pads engage a desired location on the module, spacer rings may be inserted between the fairings.

The first step in the installation of fairings 20 on a riser section 10 is to attach the lower retainer ring 17 to the riser section. The retainer ring should be capable of supporting the dry weight of all the fairings to be mounted on the section. The fairings are then mounted on the riser section on top of each other. FIG. 1 shows six fairings attached to riser section 10. However, the number of fairings to be mounted on the riser section will depend on the size of the fairings, the length of the riser section and whether spacers rings are used between fairings. Once the fairings are mounted on the riser section, the upper retainer ring 17 is attached to the riser section.

As the upper fairings on the riser section are being mounted, the lower fairings on the riser section may be subjected to wave and current forces. In accordance with this embodiment of the present invention, the bearing pads 28 and 29 in association with spring asemblies 30 keep the fairings' longitudinal axes substantially parallel to the longitudinal axis of the riser section.

The retainer rings 17 are preferably attached to the riser section 20 so that the fairing shoulders 27 remain in sliding engagement with each other. Sufficient clearance between the fairings is provided to permit the fairings to rotate with respect to each other. However, the retainer rings preferably prevent the fairing shoulders 27 from moving apart more than a miniscule amount. This vertical confinement of the fairings aids in preventing rotational motion of the fairings such that their longitudinal axes would be rotated out of parallel alignment with the longitudinal axis of the riser section. Thus, vertical confinement aids in preventing tilting of the fairings with respect to the riser. Such rotational motion could cause interference between the tail portions 22 of adjacent fairings.

The following example illustrates the importance of maintaining the fairings' longitudinal axes substantially parallel to the longitudinal axis of the riser section 10. In this example, fairings similar to those illustrated in FIGS. 1–3 are mounted on a riser section. Each fairing has a height of 60 inches (152.4 centimeters) and length of 100 inches (254 centimeters). The riser section has buoyancy modules that are ellipitcal with the outer diameter varying from 38 inches (96.52 centimeters) to 40 inches (101.5 centimeters). The nose portions of the fairings are sized to accommodate a 40 inch (101.5 centimeter) buoyancy module, The distance between the tail portions of the fairings when mounted on such a buoyancy module is 3 inches (7.62 centimeters). Under these conditions, if the fairings are aligned along the minor axis (96.52 centimeters diameter) and are not restrained in accordance with this invention from rotational movement of the fairings' longitudinal axes with respect to the riser section's longitudinal axis, the fairings' longitudinal axes can rotate approximately one degree from or out of parallel alignment with the riser section's longitudinal axis. This one degree of misalignment results in the tip of each fairing's tail moving (either up or down) approximately 1.7 inches (4.3 centimeters). Thus, if two adjacent fairings spaced 3 inches (7.62 centimeters) apart at the tails are caused to rotate around the riser section in counter directions, the fairing tails could interfere with each other.

Figure 4:
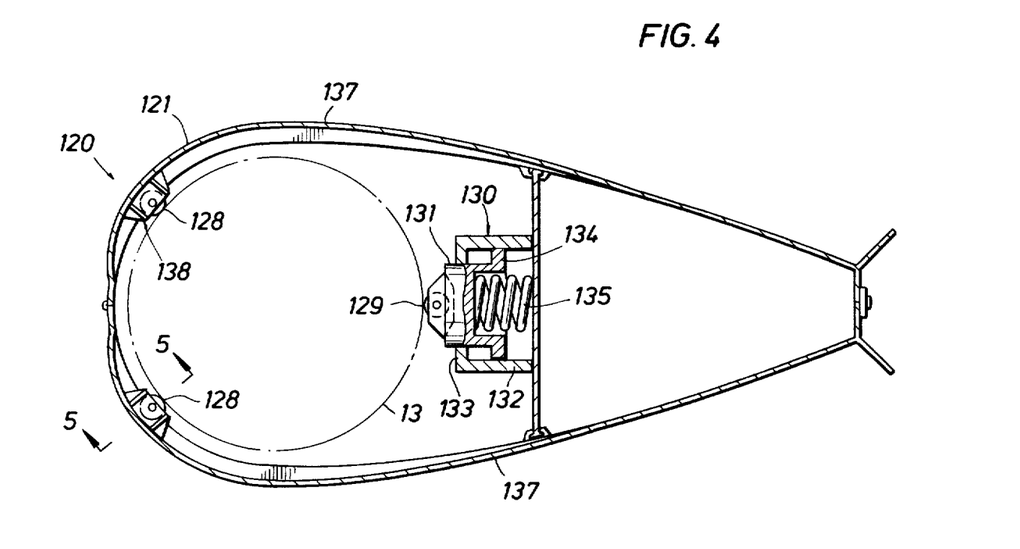
FIG. 4 is a section view of another embodiment of a fairing of the present invention.
Figure 5:
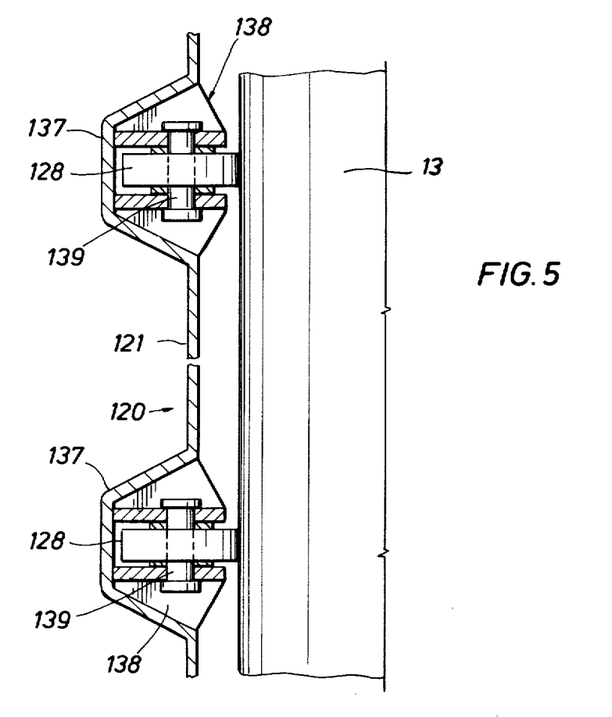
FIG. 5 is an enlarged sectional view taken along line 5—5 of FIG. 4 with shoulders at the top and bottom of the fairing removed for purposes of clarity.

FIGS. 4–5 illustrate another embodiment of a fairing of this invention showing another means for pressing bearings located on the down-current side of the fairing against buoyancy module 13 to ensure that the longitudinal axis of the fairing's nose position is maintained substantially parallel to the longitudinal axis of the riser section 10. Fairing 120 is similar in construction to fairing 20 of FIGS. 2-3, except that rollers 128 and 129 provide bearing contact between the fairing and buoyancy module 13 and each fairing shell has two upstanding ribs 137 that extend horizontally on the outer surface of the shells. Four rollers 128 are shown attached to the nose portion 121 of the fairing by roller frame assemblies 138. Frame assemblies 138 are housed in ribs 137 which extend from the leading edge of the nose to the tail portion of the fairing. The upstanding ribs taper from front-to-back with the maximum thickness of the ribs occurring at the location of the rollers. Roller frame assemblies 138 are secured within the ribs 137 by bolts, rivets, welding or any other suitable means. The rollers 128 are supported on the frame assembly on axial shafts 139. Rollers 128 may be made of rubber, plastic or other suitable materials. Use of ribs 137 to house a portion of the rollers 128 is desirable to minimize the overall width of the fairing.

Spring assemblies 130 (only one of which is in view in FIG. 4) are similar in construction to spring assemblies 30 of FIGS. 2-3. Each assembly 130 comprises a roller 129 held against buoyancy module 13 by a helical compression spring 135. Forcing roller 129 against the buoyancy module 13 causes the fairings to fit snugly to the buoyancy module as the fairing rotates on the buoyancy module. Piston 131 is retained within housing 132 by end cap 133 and flange 134.

Figures 6, 7, 8:
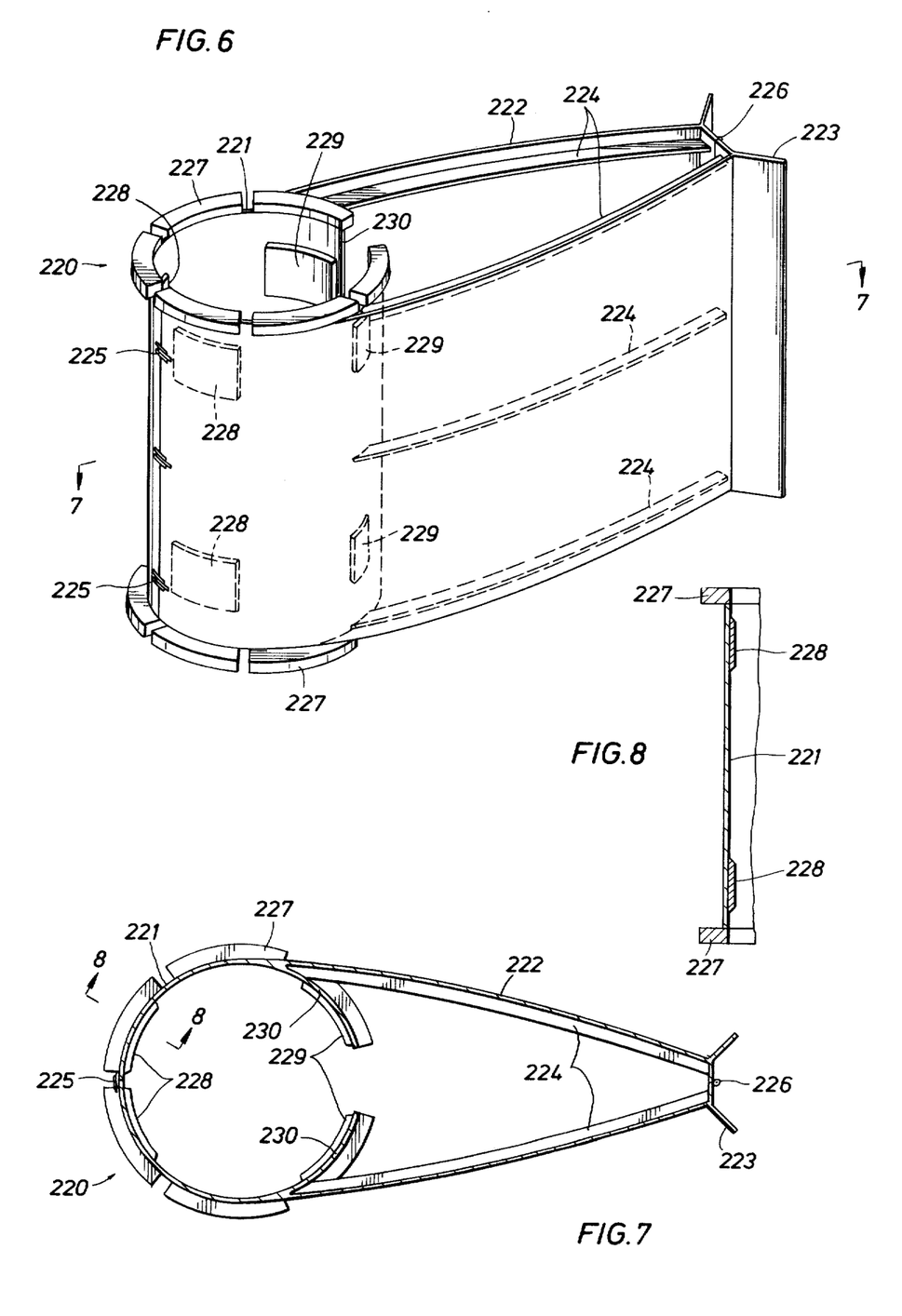
FIG. 6 is a perspective view of still another embodiment of a fairing of the present invention.
FIG. 7 is a sectional view taken along line 7—7 of FIG. 6.
FIG. 8 is a sectional view taken along line 8—8 of FIG. 7.

FIGS. 6-8 illustrate still another embodiment of this invention showing another means for applying a bearing force on the down-current side of the fairing. Fairing 220 comprises a nose portion 221 and a tail portion 222. The nose portion 221 has a central opening to accommodate buoyancy module 13. Flexible spring members 230 formed integrally with the nose portion 221 provide spring tension to force bearing pads 229 to the down current side of the buoyancy module. In the unstressed condition, the radius of the curvature of each spring member 230 is slightly smaller than the radius of the curvature of the buoyancy module 13. When the fairing shells are fitted around the buoyancy module, the spring members 230 flex to accommodate the larger diameter of the module and thereby exerts spring tension on the pads 229.

Spring members 230 are preferably made of a plastic material that has elastic characteristics. Most preferably the fairing shells and spring members 230 are both made of syntactic foam sandwiched between layers of fiberglass.

Shoulders 227 are attached at the top and bottom of the fairings to provide a bearing surface to resist thrust and axial loading from adjacent fairings. The shoulders are segmented to facilitate flexing of spring members 230 and nose portion 221.

In fabricating fairings illustrated in FIGS. 6-8 for installation on a drilling riser having buoyancy modules with different circumferences, it may be convenient to fabricate the fairings for fitting about the buoyancy module having the largest circumference. The modules having a circumference smaller than the circumference of the largest module may be fitted with the fairings by inserting one or more elastic washers or shims between the bearing pads and spring members 230.

Figure 9:
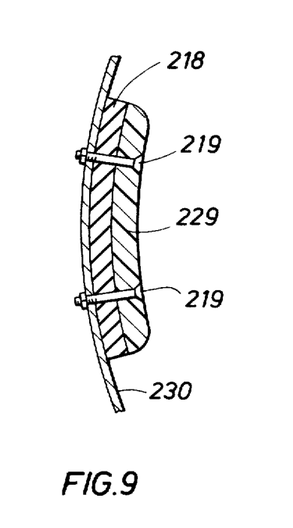
FIG. 9 is an enlarged sectional view of another means for accommodating movement of the bearing pads of FIGS. 6-8.

FIG. 9 shows an example of a shim 218 between pads 229 and spring member 230. The thickness of shim 218 is sized to insure that pad 229 engages the buoyancy module 13 with sufficient force to assure that the longitudinal axis of the fairing will be substantially parallel to longitudinal axis of the module 13 as the fairing rotates on the riser. Stainless steel bolts 219 hold the pad 229 and shim to the spring member 230. The shim is preferably made of a soft (low durometer hardness) elastic material such as synthetic or natural material such as synthetic or natural rubber, polyurethane, or other suitable elastomeric materials so that the bearing pad 229 will have a compliant connection to the fairing body. The elastic material should be capable of being compressed by pad 229 and returning to its original shape when not being compressed by pad 229.

While FIG. 9 shows shim 218 used with pads 229, shims similar to shim 218 may also be used with pads 228 and with the bearing pads 28 and 29 illustrated in FIGS. 2-3.

FIG. 10 illustrates still another mechanism for forcing a bearing pad against buoyancy module 13. Pad 339 is identical to pads 228 and 229 of FIGS. 6-8. Pad 339 is attached by any suitable means to a rigid support member 340 that has flanges 334 at the upper and lower ends thereof. Support member 340 has flange 334 that is held onto fairing structure 330 by retainer 332. Retainer 332 prevents movement of the support member 340 with respect to fairing structure 330 as the fairing rotates on the buoyancy module. Pad 339 and support member 340 are forced against module 13 by curved compression spring 333.

An elongated element having a fairing of this invention mounted thereon may be moved through a fluid medium, or the fluid medium may be moving past the elongated element, or both. In general, the fluid medium is water, either fresh water or sea water, but the fluid medium may be air or other gases.

The fairings of this invention are for pipes or other substantially rigid structures to reduce the force of current flow against it, and are not limited for use on marine drilling risers. The fairings may also be used on pipelines, on production risers or on vertical pipes used in subsea mining operations.

It will be apparent from the foregoing that the present invention offers significant advantages over fairings previously known in the art. The principal advantages include ease of handling and installing the fairings on riser sections having buoyancy modules, mounting stability even on non-uniform surfaces usually found on riser buoyancy modules, and low resistance to turning on the buoyancy modules as the current direction changes.

The principle of the invention and the manner in which it is contemplated to apply that principle have been described. It is to be understood that the foregoing is illustrative only and that other means and techniques can be employed without departing from the true scope of the invention as defined in the following claims.

What is claimed is:

1. A fairing for a marine drilling riser having a plurality of pipes and a flotation assembly for use about the pipes wherein the flotation assembly comprises semi-annular flotation modules made of a buoyant material having a convex non-uniform outer surface and clamping means for holding said flotation modules about the pipes, said fairing comprising:

a body of substantially rigid material forming a streamlined symmetrical structure having a nose portion, a tail portion, and two opposed side portions, said nose portion having an opening along its axis to accommodate said pipes and flotation assembly, spring means formed of a flexible material, said spring means having opposed first and second ends, said first end being fixedly attached to the nose portion of said body and said second end extending to a position located on the down-current side of and proximate to said flotation modules, the inner surface of said spring means being concave to generally conform to the convex outer surface of said flotation modules, and bearings connected to the inner surface of said spring means, said spring means being configured and positioned such that positioning of said riser in said fairing body opening forces said spring means second end in a down-current direction away from its unrestrained position whereby said bearings are biased against said flotation modules.

2. The fairing of claim 1 wherein said spring means includes two curved plates of flexible material each having first and second ends, the first end of one of said plates being fixedly attached to one of said side portions and the first end of the other of said plates being fixedly attached to the other of said side portions, said second ends of said plates extending one toward the other.

3. A fairing adapted to be rotatably mounted about the longitudinal axis of a substantially rigid elongated element for reducing current-induced forces on said elongated element when immersed in a fluid medium, comprising:

a streamlined outer shell having a fore end and an aft end, said shell being adapted such that in response to said fairing being placed on said elongated element, said shell fore end is oriented upstream relative to flow of said fluid medium, said shell including opposed, fore and aft extending, substantially symmetrical shell side elements;

a tail portion, said tail portion having an outer surface defined by aft portions of said shell side elements;

a nose portion having an outer surface defined by forward portions of said shell side elements, said nose portion defining a recess adapted for receiving said elongated element, said recess having fore and aft radial boundaries;

a forward bearing surface attached at a forward position on said nose portion, said forward bearing surface being relatively upstream of said elongated element and being adapted for contacting and transmitting to said elongated element current induced forces exerted by relative motion of said fluid medium past said fairing; and an aft bearing member fixedly attached to one of said shell side elements and projecting therefrom to a position aftward of said forward bearing surface and being adapted for foreward and aftward flexure in response to the application of foreward and aftward force to said aft bearing member at a position a spaced distance from said one of said side shell elements, said aft bearing member having an aft bearing surface adapted for contacting said elongated element at a substantially downstream position thereon, said aft bearing member and aft bearing surface being configured such that in response to positioning said fairing on said elongated element, said aft bearing member is displaced aftward from its unrestrained position to accomodate said elongated element.

* * * * *